United States Patent [19]

Sumita et al.

[11] Patent Number: 4,916,751
[45] Date of Patent: Apr. 10, 1990

[54] ROLLING BEARING

[75] Inventors: Yuichi Sumita, Fujisawa; Yukio Ohura, Hiratsuka; Katsuya Toma, Chigasaki, all of Japan

[73] Assignee: Nippon Seiko Kabushiki Kaisha, Tokyo, Japan

[21] Appl. No.: 314,907

[22] Filed: Feb. 24, 1989

[30] Foreign Application Priority Data

Feb. 29, 1988 [JP] Japan ................................. 63-46690

[51] Int. Cl.⁴ ........................ F16C 33/58; F16C 41/04
[52] U.S. Cl. .................................... 384/516; 384/448; 384/491; 384/625
[58] Field of Search ............... 384/448, 490, 491, 492, 384/513, 516, 565, 569, 625; 51/289 R

[56] References Cited

U.S. PATENT DOCUMENTS 4,153,308  5/1979  Ladin ................... 384/516
4,317,600  3/1982  Li ........................ 384/491

FOREIGN PATENT DOCUMENTS 40208  11/1974  Japan .
23520   2/1986  Japan .
24818   2/1986  Japan ................................. 384/565
274115 11/1987  Japan .
486161  9/1975  U.S.S.R. ............................. 384/516

Primary Examiner—Thomas R. Hannon
Attorney, Agent, or Firm—Basile and Hanlon

[57] ABSTRACT

At least one of the contacting surfaces of an outer ring, an inner ring and surfaces of rolling elements of a rolling bearing are formed with a plurality of groove-shaped recess portions having a depth of 0.0005 to 0.008 mm, and with smooth surface portions having a roughness of 0.08 μmRa partitioned by the groove-shaped recess portions. The groove-shaped recess portions do not disappear completely during rotation. In manufacturing the rolling bearing, a multi-process superfinishing operation is used in which firstly, the groove-shaped recess portions, having a depth of 0.0005 to 0.008 mm, are formed in at least the raceway surface of the outer ring of the rolling members by using a rough particle whetstone having an average particle size of 20 to 40 μm, and subsequently, the smooth surface portions having the roughness equal to or smaller than 0.08 μmRa and partitioned by the many groove-shaped recess portions are formed by using a minute particle whetstone for finishing work having an average particle size of 0 to 8 μm.

6 Claims, 4 Drawing Sheets

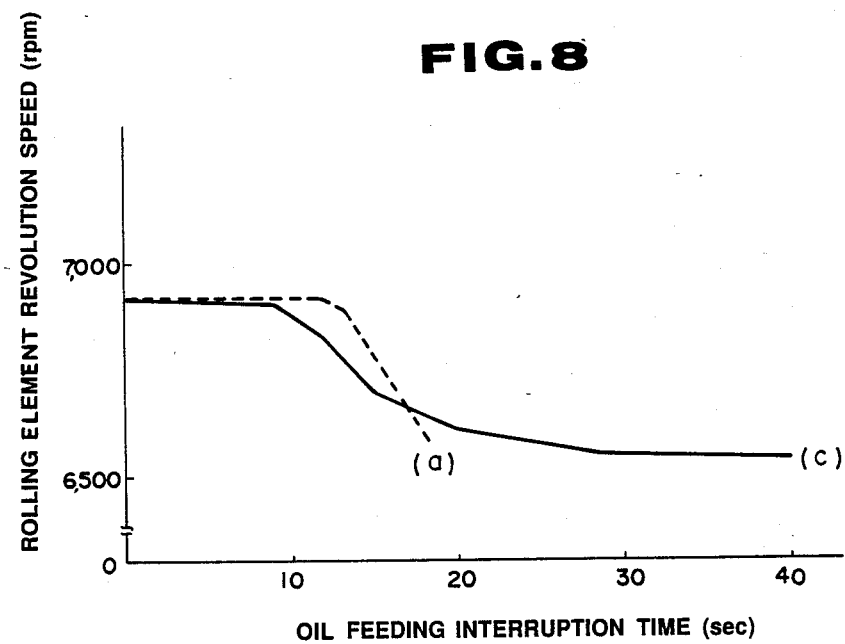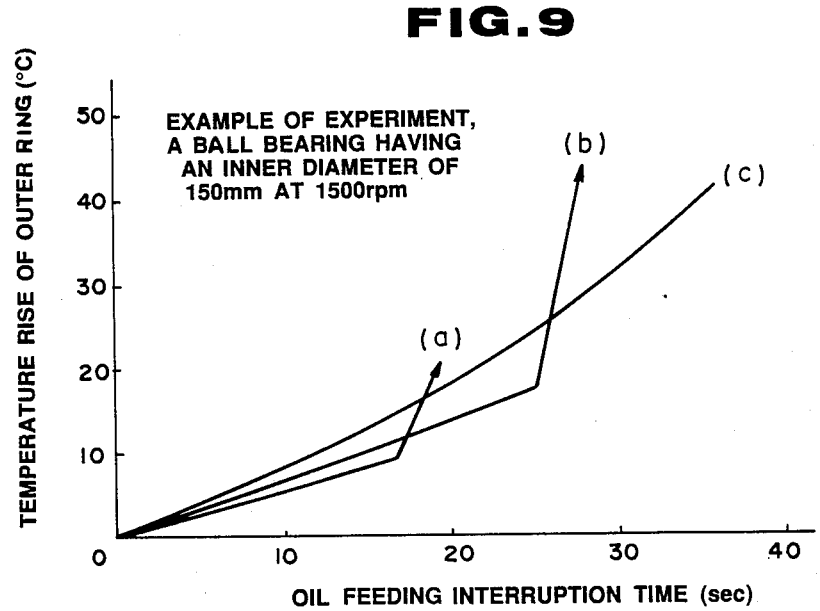

ROLLING BEARING

BACKGROUND OF THE INVENTION

1. Field of the Invention

The present invention relates to an improvement in a rolling bearing such as a ball bearing, a tapered roller bearing, a cylindrical bearing, a self-aligning roller bearing, or a thrust bearing, and in particular, to a rolling bearing capable of performing satisfactorily during severe conditions in which the feeding of lubricating oil is frequently interrupted during rotation at high speeds by controlling the relative movement between a raceway ring and the rolling elements.

2. Description of the Prior Art

The longevity of a rolling bearing is closely related to the degree of formation of a lubricating oil film on the rolling contact surface between the raceway ring and rolling elements of the bearing.

Accordingly, heretofore, several proposals have been made as to the formation of the lubricating oil film on the rolling contact surface of the bearing.

For example, in Japanese Utility Model Publication No. 49-40208, at least one of an outer ring, an inner ring, and the rolling elements of a rolling bearing has a shallow spiral-shaped waviness formed therein by grinding, superfinishing, or polishing. The shallow spiral-shaped waviness, on the order of a micron, does not affect the load capacity of the bearing. As a result, when the bearing is rotated, the spiral-shaped waviness acts as a screw pump and the lubricating oil is spread uniformly over the whole contact surface thereby forming an oil film.

In Japanese Patent Laid-Open Publication No. 62-274115 and Japanese Utility Model Laid-Open Publication No. 61-23520, a cross or mesh pattern having a depth of 0.1 to 0.4 $\mu$m is formed by superfinishing in either or both of a raceway surface of a raceway ring and rolling element surface, so that convex portions thus formed are disposed, and the concave portions are connected serially in the axial direction and in the circumferential direction, thereby to enhance the oil film holding function.

However, in the former case, it is intended that the lubricating oil be uniformly distributed over the whole contact surface between the bearing raceway and the rolling elements due to the action of the shallow, spiral-shaped waviness. It is an aim, in such a structure, to solely improve the lubricating property based on the premise that the bearing is to be used in a normal, continuously oil fed condition. In other words, it is not intended that the bearing be used in a severe condition in which the supply of lubricating oil is frequently interrupted. Furthermore, a problem is posed in that it is very difficult to form the spiral-shaped waviness at a cost which is economically reasonable.

On the other hand, in the latter case, it is intended to improve the retention of the lubricating oil film during transportation of the bearing or at the start of operation of the bearing. It is the aim to exclusively solve the problem of impressions resulting from vibration of the bearing during transportation. In other words, in the bearing which is assembled to equipment and before the bearing is used in its operating condition, a sufficient lubrication oil film is not yet formed on the contact surface between the raceway ring and the rolling elements. As a result, impressions are caused by repeated tapping at the contact portion between the raceway ring and the rolling elements due to vibrations during transportation, resulting in an increase in the vibrations and sound of the bearing during use. Thus, it is desirable to prevent such a phenomenon. Specifically, the convex and concave portions in the cross shape, produced by the superfinishing in the latter case, are required at the time of transportation or the start of operation of the bearing before the bearing is used in its rotating condition. Once the bearing is assembled to equipment and driven into rotation, the concave and convex portions are not necessary. Accordingly, the depth of the cross-shaped pattern is restricted to a depth of, for example, 0.1 to 0.4 $\mu$m which is flattened with the lapse of time by contact surface pressure between the raceway ring and the rolling elements.

However, recently, in high technical fields, the working conditions for bearings are becoming very severe. There is a need for a bearing which is not damaged such as by seizure or the like even under severe conditions in which, for example, the supply of lubrication oil is interrupted repeatedly for certain short times, such as 30 seconds, for a bearing rotating at high speeds under oil lubrication.

The general behavior of a bearing in a condition in which the supply of lubrication oil is temporarily interrupted is considered as follows.

Generally, in a bearing rotating at high speeds, the outer ring side is burdened with greater load, due to the centrifugal force acting on the rolling elements, as compared with the inner ring side. In a usual high speed operating condition, in which the lubricating oil is continuously supplied normally, since the lubricating oil is sufficient it may be considered that a satisfactory oil film is formed between the raceway ring and the rolling elements. As a result, there is no large difference in friction coefficient between the outer ring side and the inner ring side, and the frictional force exerted to the outer ring is larger than that exerted to the inner ring side by the amount of the rolling element load which is applied more to the outer ring side than the inner ring side. This allows the rolling elements to rotate in a substantially pure rolling condition at the outer ring side.

Supposing that the supply of the lubricating oil is interrupted temporarily, in a usual bearing which is used with its inner ring in rotation, since the lubricating oil on the surface of the inner ring flows off due to centrifugal force, the oil film on the inner ring side disappears and thus, the degree of metal contact is increased. As a result, the friction coefficient of the inner ring side increases rapidly. On the other hand, since there is no such centrifugal force acting on the outer ring side, the lubricating oil remains. Accordingly, the metallic contact portion is small at the outer ring side, and rapid increase of the friction coefficient is not caused as compared with the inner ring side.

For this reason, after a certain time elapses during which the supply of lubricating oil is interrupted, the frictional force of the inner ring side exceeds that of the outer ring side. At this time, the rolling elements rotate substantially in a pure rolling condition at the inner ring side, and simultaneously, rotate in a condition with a slight slip at the outer ring side. When the rotating conditions change to those described above, due to the interruption of the lubricating oil, a large skew and a gyro-slip occur causing the movement of the rolling elements to become unstable. At the same time, since revolution and rotation about their own axes are caused, heat is generated at the contact portion.

Because of the heat generated at the contact portion, the temperature of the rolling elements which have a small thermal capacity rises rapidly, and the tack strength of the oil at the surfaces of the rolling elements is weakened. Consequently, the supply of lubricating oil from the outer ring side to the inner ring side which has been effected through the rotation of the rolling elements becomes scarce, and the oil film is broken between the rolling elements and the inner ring resulting in seizure.

Such a seizure due to the unstable movement of the rolling elements occurring because of the interruption of the lubricating oil during high speed rotation occurs easily in the case of a typical bearing when the roughness of the raceway surfaces of the inner and outer rings is 0.01 to 0.08 μmRa. In contrast, when the roughness of the above-mentioned raceway surfaces is made to be equal to or greater than 0.08 μmRa, it is somewhat advantageous since the friction coefficient can be increased to such an extent that the unstable movement of the rolling elements is restricted. However, in this case, since the minute concave and convex portions, which constitute the roughness on the raceway surfaces, are flattened during repetitive interruption of the lubricating oil, seizure will occur in a similar fashion to the case in which the roughness of the raceway surfaces is equal to or smaller than 0.08 μmRa. On the other hand, if the roughness of the raceway surfaces is made to be extremely rough, seizure will easily occur due to the heat generated by friction.

SUMMARY OF THE INVENTION

The present invention is directed to the above problems, and it is an object of the invention to provide a rolling bearing capable of preventing such seizure by controlling movement of rolling elements by appropriately restricting the frictional force between a raceway ring and the rolling elements even under working conditions in which the supply of lubricating oil is repeatedly interrupted for a short time during rotation at high speeds.

In order to achieve the above object, in the present invention, at least one of the contacting surfaces of an outer ring, an inner ring and surfaces of rolling elements of a rolling bearing is formed with a plurality of groove-shaped recess portions having a depth of 0.0005 mm to 0.008 mm, and with a plurality of smooth surface portions, partitioned by said groove-shaped recess portions. The smooth surface portions have a roughness equal to or smaller than 0.08 μmRa, and the groove-shaped recess portions do not disappear completely during rotation after start of operation.

It is preferable that the groove-shaped recess portions extend at predetermined angles with respect to the circumferential direction of the bearing, and that the groove-shaped recess portions cross one another.

Furthermore, the width of each of the groove-shaped recess portions is narrower than the minor axis of a Hertz's contact ellipsoid formed at the point of contact between the raceway surface and the rolling element. Correspondingly, the width of each of the smooth surface portions is smaller than the major axis of the Hertz's contact ellipsoid.

Moreover, when the groove-shaped recess portions and the smooth surface portions are provided in each raceway surface of the outer ring and the inner ring, it is preferable that the roughness of the outer ring raceway surface and the roughness of the inner ring raceway are equivalent to each other. The present invention is applicable to rolling bearings in which the rolling elements are ball bearings.

In a method for manufacturing the rolling bearing mentioned above, a rough particle whetstone having an average particle size of 20 to 40 μm is used at a first stage in superfinishing, and thereafter, a minute particle whetstone for finishing having an average particle size of 0 to 8 μm is used in multistage finishing work for the raceway surface and the surfaces of the rolling elements.

In the rolling bearing structured as mentioned above, when the lubricating oil is supplied satisfactorily, the rolling elements are substantially in a pure rolling condition at the outer ring side, and the load is supported by an oil film formed on the smooth surface portions having a roughness corresponding to 0.08 μmRa.

On the other hand, when the supply of lubricating oil is interrupted, the generation of the pressure by the oil film, as mentioned above, on the smooth surface portions of the outer ring side is blocked at the deep groove-shaped recess portions so as to increase the friction coefficient at the raceway surface of the outer ring, and a friction coefficient of a suitable magnitude is obtained at the outer ring side by a slight metallic contact between the edges of the groove-shaped recess portions and the rolling elements. As a result, the unstable slip movement of the rolling elements due to a rapid change of the frictional force from the outer ring side to the inner ring side, as described above, can be controlled. In this case, the density of distribution of the groove-shaped recess portions is selected so that a plurality of groove-shaped recess portions are present within the Hertz's contact ellipse formed by the raceway surface and the rolling elements. Accordingly, the function of an oil reservoir is fulfilled secondarily, and metallic adhesion is not caused. As a result, the seizure of the bearing is prevented even in a condition in which the interruption of the lubricating oil for a short time is repeated.

Furthermore, the edges of the groove-shaped recess portions are plastically deformed into the recess portions due to stress concentrations at the peripheral edges of the smooth surface portions which support the load. However, since the depth of the groove-shaped recess portions is selected to be a depth which cannot be filled completely by the plastically deformed edges, the initial properties of the bearing are not lost even when the interruption time of the oil feeding is extended and repeated.

Specifically, the function of the groove-shaped recess portions is to control the movement of the rolling elements by frictional force, and since the retaining of the oil is secondary, the groove-shaped recess portions should not disappear during operation. From this view, the depth of the groove-shaped recess portions is restricted. When the depth of the groove is less than 0.0005 mm, the plastically deformed edges of the smooth surface portions will enter the groove-shaped recess portions during repetition of the oil interruption, and the recess portions will disappear. Thereafter, the friction coefficient of the raceway surfaces of the inner and outer rings will become small as in a normal rolling bearing. As a result, it is impossible to restrict the unstable movement of the rolling elements and seizure will occur due to the heat generated by increased slip.

On the other hand, when the depth is larger than 0.008 mm, the function of generating an oil pressure at the smooth surface portions for supporting the load in an oil fed condition is degraded extremely. Consequently, during rotation under normal oil feed conditions, metallic contact is caused between the raceway surface of the raceway ring and the rolling elements, and the life of the bearing is reduced.

Furthermore, when the roughness of the smooth surface portions is equal to or larger than 0.08 μmRa, the generation of heat and wear are so great that it is not suitable for practical use.

Moreover, since the groove-shaped recess portions cross each other, it is possible to make the slip friction coefficient substantially uniform in each direction within the contact ellipse during interruption of oil feeding. Accordingly, it is more effective in suppressing the unstable movement of the rolling elements.

In the present invention, with the rolling bearing structured as described above, the advantage are as follows.

By forming predetermined groove-shaped recess portions and smooth surface portions in at least the raceway surface of the outer ring, it is possible to suppress the unstable movement of the rolling elements even under such working conditions in which the interruption of the supply of lubricating oil for a certain time period is repeated. Accordingly, seizure is prevented and bearing life is extended.

Furthermore, by determining the width of each of the groove-shaped recess portions and the number of groove-shaped recess portions relative to the size of the Hertz's contact ellipse, the present invention is applicable to various types and sizes of rolling bearings.

By forming the groove-shaped recess portions to extend at predetermined angles with respect to the circumferential direction of the bearing and to make the groove-shaped recess portions cross each other, it is possible to suppress various complicated slip movements.

In addition, when the groove-shaped recess portions and the smooth surface portions are formed in a ball bearing, the suppression effect of gyro-movement inherent in the ball bearing during interruption of oil feeding is especially significant, and the anti-seizure property can be improved.

Moreover, in the manufacturing method of the present invention, since the groove-shaped recess portions and the smooth surface portions are formed by multi-superfinishing work, no particular manufacturing apparatus is necessary and it is possible to mass produce a rolling bearing easily and at low cost, which will ensure long life even under such working conditions wherein the interruption of lubricating oil is repeated.

Other objects and features of the present invention will become apparent by reference to the following description and to the drawings.

BRIEF DESCRIPTION OF THE DRAWINGS

FIG. 8 is a correlation graph between oil feed interruption time and revolution speed of rolling members in a comparison test between a prior art bearing and the bearing of FIG. 1;

FIG. 9 is a correlation graph between oil feed interruption time and outer ring temperature rise in the comparison test mentioned above;

DESCRIPTION OF THE PREFERRED EMBODIMENTS

Figure 1:
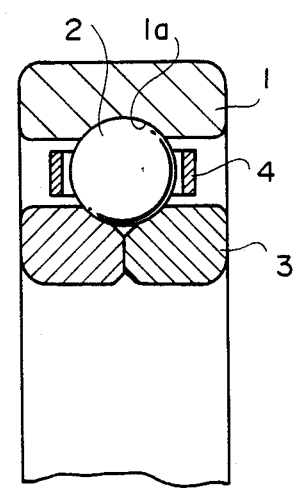
FIG. 1 is a longitudinal sectional view of a main part of a ball bearing and an embodiment of the invention.

FIG. 1 shows a partial cross section of a single row ball bearing. Reference numeral 1 designates an outer ring, 2 a rolling element, 3 an inner ring of the division type, and 4 a retainer.

Figure 2:
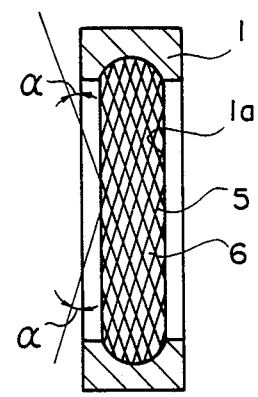
FIG. 2 is a schematic diagram of an example of the outer ring raceway surface of the ball bearing of FIG. 1.

In the raceway surface 1a of the outer ring 1, shown in FIG. 2, many groove-shaped recess portions 5 are formed having a depth of 0.005 mm to 0.008 mm with smooth surface portions 6, partitioned by the groove-shaped recess portions 5, interposed therebetween.

The groove-shaped recess portions 5 comprise two groups of parallel grooves. One group of grooves extend at an angle α with respect to one circumferential direction of outer ring 1, and the other group of grooves extend at an angle α with respect to the opposite circumferential direction, so that the two groups of grooves cross each other. Thus, in this case, individual smooth surface portions 6 are provided which are discrete and independent of each other. The angle α is not limited to a particular value, however, according to experimental results, a range of 10 to 20 degrees is effective.

Figure 3:
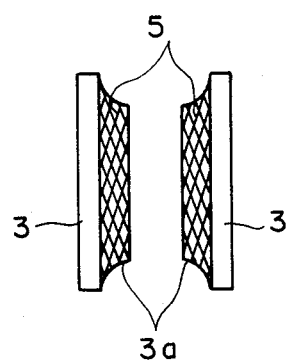
FIG. 3 is a schematic diagram of an example of the inner ring of the ball bearing of FIG. 1.

The groove-shaped recess portions 5 may also be formed in the raceway surface 3a of the inner ring 3 as shown in FIG. 3.

Figure 4:
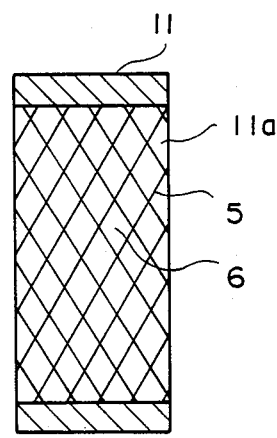
FIG. 4 is a schematic diagram of an outer ring of a roller bearing to which the invention is applied.

FIG. 4 shows groove-shaped recess portions 5 similar to those shown in FIG. 2, formed in a raceway surface 11a of an outer ring 11 of a roller bearing.

Figure 5:
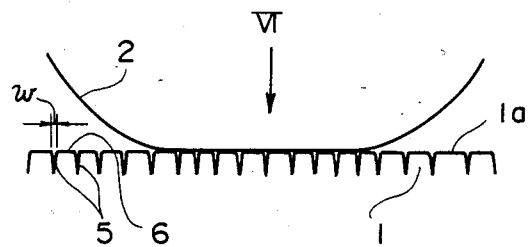
FIG. 5 is an axial sectional schematic diagram showing a contact condition of the outer ring and the ball of the ball bearing of FIG. 1.
Figure 6:
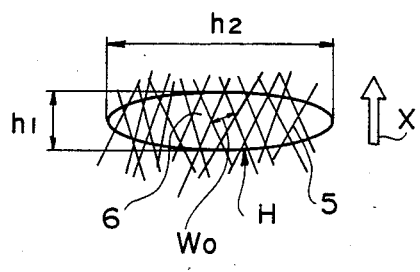
FIG. 6 is a schematic diagram of a Hertz's contact ellipse as viewed in the direction of arrow VI in FIG. 5.

FIG. 5 shows schematically an axial cross section of the contact conditions between the raceway surface 1a of the outer ring 1 and the ball 2. As is shown, the range of contact of the ball 2 with respect to the raceway 1a is long due to the Hertz's elastic contact. As a result, the shape of the contact plane on the raceway surface is a Hertz's contact ellipse H as shown in FIG. 6. In FIG. 6, a minor axis h1 extends in the rolling direction X of ball 2, and a major axis h2 extends in the axial direction. For example, in the case of a ball bearing having an inner diameter of 150 mm, the major axis h2 is about 4 mm, and the minor axis h1 is about 1/10 to 1/20 of the major axis.

Each one of the groove-shaped recess portions 5 has a width W, FIG. 5, narrower than the minor axis h1 of the Hertz's contact ellipse H. The reason for this is that when the width w is greater than the minor axis h1, the ball 2 will fall into the recess of the groove-shaped recess portions 5 resulting in the likelihood that the smooth rolling of ball 2 will be disturbed.

The smooth surface portions 6, formed by partitioning by the groove-shaped recess portions 5, have a width w0 between adjacent parallel grooves. Width w0 is formed narrower than the major axis h2 of the Hertz's contact ellipse H. The reason for this is that if the maximum width w0 is greater than the major axis h2, the number of groove-shaped recess portions 5 existing within the Hertz's ellipse H, which constitutes the contact surface between the ball and the raceway surface, is too small; in an extreme case, the contact ellipse H will be occupied by only one of the smooth surface portions 6. As a result, it is impossible to ensure a sufficient friction coefficient between the ball and the raceway surface.

Although specifications change depending on operating conditions, according to the test described later, it was particularly effective when the depth of the groove-shaped recess portions 5 were in a range of 0.0005 mm to 0.002 mm, and the quantity of the groove-shaped recess portions 5 were in a range of 10 to 40 per 1 mm within the Hertz's ellipse H.

The groove-shape recess portions 5 and the smooth surfaces 6 are formed by superfinishing work. In conventional superfinishing work methods, it has been the aim to remove rough and harmful ground surfaces and to obtain a smooth surface with a suitable roughness. For this reason, in a normal superfinishing operation, it is impossible to work the groove-shaped recess portions having the above-mentioned deep roughness.

Therefore, in the present embodiment, in order to work the groove-shaped recess portions 5 having deep roughness and the smooth surface portions 6 partitioned by the former, a multi-process superfinishing operation including several processes described below is applied to the raceway surface 1a of the outer ring 1 and the raceway surface 3a of the inner ring 3 thereby to manufacture a desired ball bearing.

In the manufacturing process, as a first step, a rough particle whetstone having an average particle diameter of 20 to 40 μm is used as a first stage of superfinishing. Deep groove-shaped recess portions are formed while controlling the relative rotational movement and the axial relative movement of the raceway surface and the whetstone.

As a second step, a minute particle whetstone for finishing work having an average particle diameter of, for example 0 to 8 μm is used. Smooth surface portions, partitioned by the deep groove-shaped recess portions reproduced by the first step are formed to have a roughness equal to or less than 0.08 μmRa.

Figure 7:
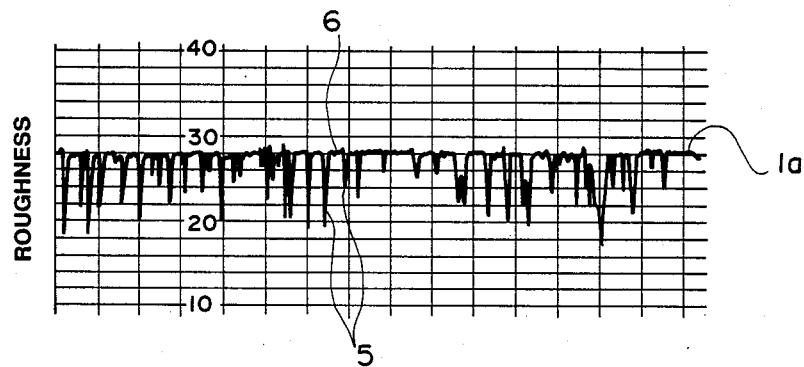
FIG. 7 is a diagram showing the roughness of the raceway surface of FIG. 2.

FIG. 7 is a partial enlarged view showing an example of the condition of the outer ring raceway surface 1a to which is applied the multi-process superfinishing work. In this case, the depth of the groove-shaped recess portions 5 is in a range of 0.0005 to 0.003 mm, and the roughness of the smooth surface portions 6 is about 0.05 μmRa.

A ball bearing manufactured as mentioned above having an inner diameter of 150 mm was put in a test machine and tested as to the interruption of lubricating oil supply during rotation at high speeds in contrast to a ball bearing of the conventional type.

Particularly, in the case of a ball bearing, in the conventional bearing, whose roughness of the outer ring raceway surface is small, the friction coefficient of the outer ring side becomes significantly small as compared with the inner ring side during interruption of the lubricating oil. As a result, the transition from a pure rolling condition (outer ring control) of the rolling elements at the outer ring side during feeding of the lubricating oil to a pure rolling condition (inner ring control at the inner ring side takes place rapidly accompanying a gyro-movement inherent to the ball bearing. Accordingly, the axis of rotation of each ball is not stable, and the movement of the ball becomes stable. Such a change, which occurs at the time of interruption of oil feeding, corresponds to the manner of change in the number of revolutions of the ball.

FIG. 8 shows the results of the test. Curve (a) indicates the conventional bearing whose outer ring raceway surface has a roughness of 0.02 μmRa. When the interruption of lubrication oil feed continues for 12 to 13 sec, the number of revolutions of the ball begins to decrease. The slow change of the number of revolutions to the beginning of the change is due to the gyro-movement accompanied thereto. Subsequently, the number of revolutions decreases rapidly due to an increase in slip caused by unstable movement of the ball. As a result of this, the temperature rose rapidly and seizure occurred.

On the other hand, curve (c) represents the bearing of the present embodiment shown in FIG. 7. The transition from the outer ring control to the inner ring control takes place without accompanying the gyro-movement resulting in a smooth decrease in the revolution speed of the ball. In this case, the generation of heat was suppressed to a minimum, and seizure did not occur.

Figure 10:
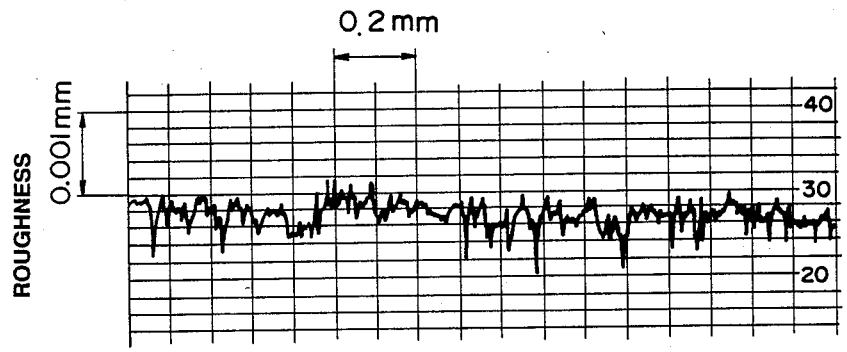
FIG. 10 is a graph of the roughness before the test of the prior art bearing of curve (b) in FIG. 9.

FIG. 9 shows temperature rise of the outer ring in a similar oil feed interruption test. In FIG. 9, curve (a) represents a conventional bearing whose roughness of the outer ring raceway surface is 0.02 μmRa, curve (b) represents a conventional bearing whose roughness of the outer ring raceway surface is 0.08 μmRa (FIG. 10 is a partially enlarged view of an example of this outer ring raceway surface before the test), and curve (c) represents the bearing of the present invention shown in FIG. 7. In the conventional bearings shown in curves (a) and (b), in either case, the temperature rises rapidly within less than 30 sec of oil feed interruption and seizure occurs. In contrast, in curve (c), the temperature rise is gradual, and seizure was not recognized even after oil feed interruption time exceeded 30 sec.

Figure 11:
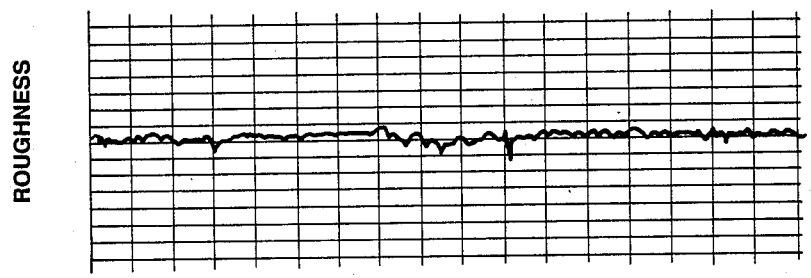
FIG. 11 is a graph of the roughness after the test of the prior art bearing of curve (b) in FIG. 9.
Figure 12:
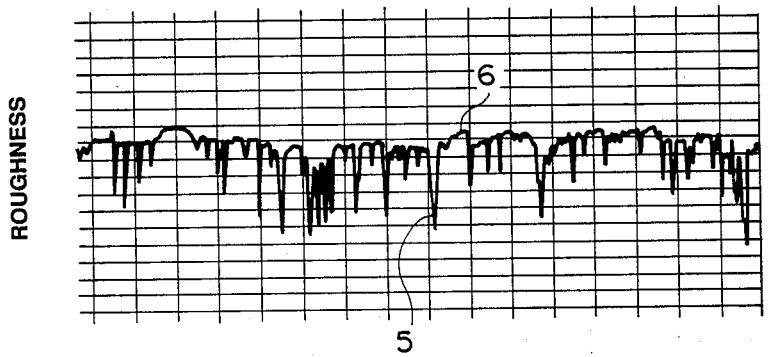
FIG. 12 is a graph of the roughness after the test of the bearing shown in FIG. 7.

FIGS. 11 and 12 show changes in the roughness of the outer ring raceway surfaces for the conventional bearing of (b), whose initial roughness is shown in FIG. 10, and the bearing (c) of the present embodiment, respectively. Both figures show roughness after high speed operation and repetition of oil feed interruption for a predetermined time. The predetermined oil feed interruption time was selected to be a time period within which no seizure occurs for the conventional bearing (b), for example 20 sec.

In FIG. 11, although seizure has not yet occurred for the conventional bearing (b) after the test, as compared with FIG. 10 showing conditions before the test, it is seen that the raised portions are crushed or flattened to fill the grooved portions. When the bearing is used in this condition with repeated oil feed interruption, the frictional force of the outer ring side is reduced and control of ball movement is impossible, resulting in seizure.

In FIG. 12, no seizure is recognized for bearing (c) of the present embodiment after the test, and as compared with conditions before the test, shown in FIG. 7, the groove-shaped recess portions 5 are not filled, and it is possible to further use the bearing with repeated oil feed interruption.

While the above embodiment is described as to the ball bearing, it is also applicable similarly to other rolling bearings including tapered roller bearings, cylindrical roller bearings, self-aligned roller bearings, and thrust bearings.

Furthermore, the groove-shaped recess portions 5 and the smooth surface portions 6 may be formed not only on the raceway surface but on the surface of the rolling elements.

While certain embodiments of the invention have been described in detail above in relation to a rolling bearing and method for manufacturing the same, it will be apparent to those skilled in the art that the disclosed embodiment may be modified. Therefore, the foregoing description is to be considered exemplary rather than limiting, and the true scope of the invention is that defined in the following claims.

What is claimed is:

1. In a rolling bearing comprising an outer ring having a raceway surface, an inner ring having a raceway surface, and rolling elements interposed between said outer and inner rings in rolling contact therewith, the improvement wherein:

at least one of the contacting surfaces of said outer ring, said inner ring and said rolling elements is formed with a plurality of groove-shaped recess portions having a depth of 0.0005 to 0.008 mm and with a plurality of smooth surface portions, partitioned by said groove-shaped recess portions, having a roughness equal to or smaller than 0.08 μmRa; and said groove-shaped recess portions are not worn completely during rotation of said rolling bearing after starting.

2. A rolling bearing as defined in claim 1, wherein said groove-shaped recess portions include two groups of parallel grooves, one group of said grooves extending at an angle with respect to one circumferential direction of said bearing and the other group of said grooves extending at an angle with respect to the opposite circumferential direction so that the two groups of parallel grooves cross each other.

3. A rolling bearing as defined in claim 1, wherein the width of said groove-shaped recess portions is less than the minor axis of a Hertz's contact ellipse formed by contact between said raceway surface of said outer ring and one of said rolling elements.

4. A rolling bearing as defined in claim 1, wherein said rolling bearing is a ball bearing and said groove-shaped recess portions and said smooth surface portions are formed on the raceway surface of said outer ring.

5. A rolling bearing as defined in claim 1, wherein said many groove-shaped recess portions and said smooth surface portions are formed by superfinishing work.

6. A rolling bearing as defined in claim 1 wherein the width of said smooth surface portions is less than the major axis of a Hertz's contact ellipse formed by contact between said raceway surface of said outer ring and one of said rolling members.

* * * * *